United States Patent [19]

Kim et al.

[11] Patent Number: 5,731,856
[45] Date of Patent: Mar. 24, 1998

[54] METHODS FOR FORMING LIQUID CRYSTAL DISPLAYS INCLUDING THIN FILM TRANSISTORS AND GATE PADS HAVING A PARTICULAR STRUCTURE

[75] Inventors: Dong-Gyu Kim, Suwon; Won-Hee Lee, Seoul, both of Rep. of Korea

[73] Assignee: Samsung Electronics Co., Ltd., Suwon, Rep. of Korea

[21] Appl. No.: 777,512

[22] Filed: Dec. 30, 1996

[30] Foreign Application Priority Data

Dec. 30, 1995 [KR] Rep. of Korea ............... 95-69746
Oct. 5, 1996 [KR] Rep. of Korea ............... 96-44131

[51] Int. Cl.$^6$ ............... G02F 1/136; G02F 1/1343; G02F 1/1345
[52] U.S. Cl. ............... 349/43; 349/46; 349/147; 349/152
[58] Field of Search ............... 349/43, 46, 54, 349/147, 149, 152

[56] References Cited

U.S. PATENT DOCUMENTS

| | | | |
|---|---|---|---|
| 5,162,933 | 11/1992 | Kakuda et al. | 349/46 |
| 5,581,382 | 12/1996 | Kim | 349/42 |
| 5,684,547 | 11/1997 | Park et al. | 349/54 |

Primary Examiner—Anita Pellman Gross
Assistant Examiner—Walter Malinowski
Attorney, Agent, or Firm—Myers, Bigel, Sibley & Sajovec

[57] ABSTRACT

A method for forming a liquid crystal display includes the steps of depositing a first metal layer on a substrate, and depositing a second metal layer on the first metal layer opposite the substrate. The first and second metal layers are patterned to provide a gate electrode on a TFT area of the substrate and to provide a gate pad on a pad area of the substrate. An insulating layer is formed on the gate electrode and on the gate pad, and on the substrate, and a semiconductor layer is formed on the insulating layer opposite the gate electrode wherein the semiconductor layer includes a channel region opposite the gate electrode and first and second spaced apart source/drain regions separated by the channel region. First and second spaced apart metal source/drain electrodes are formed on the respective first and second spaced apart semiconductor source/drain regions, and a protective layer is formed on the exposed portion of the first semiconductor layer opposite the substrate, on the first and second metal source/drain electrodes opposite the substrate, and on the insulating layer opposite the gate pad. A first contact hole is formed in the protective layer exposing a portion of one of the source/drain electrodes, and a second contact hole is formed in the protective layer and the insulating layer exposing a portion of the gate pad wherein the second contact hole exposes only a surface portion of the gate pad opposite the substrate. A transparent conductive layer is formed on the protective layer opposite the substrate, and the transparent conductive layer is patterned to form a pixel electrode electrically connected to the exposed portion of the source/drain electrode and to the exposed portion of the gate pad.

25 Claims, 19 Drawing Sheets

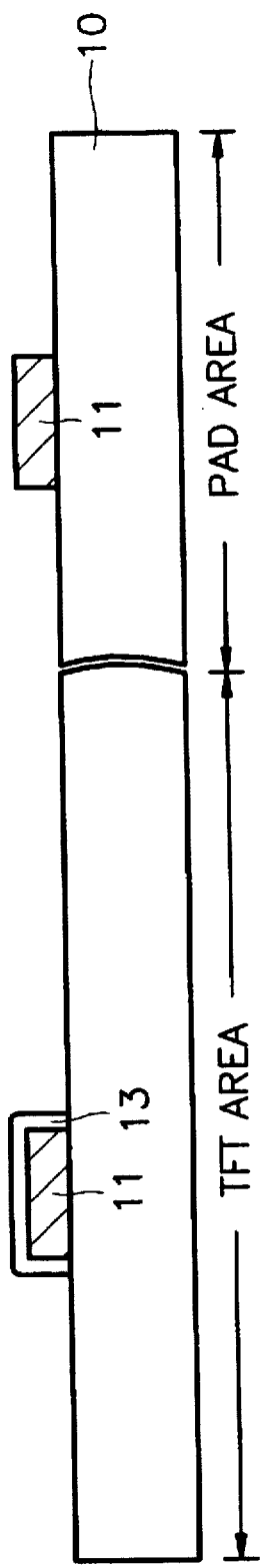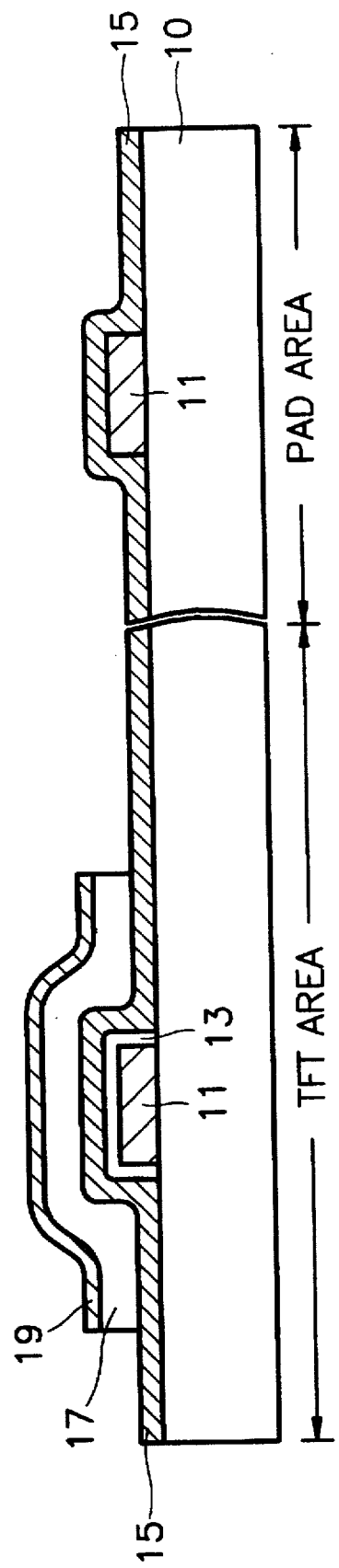

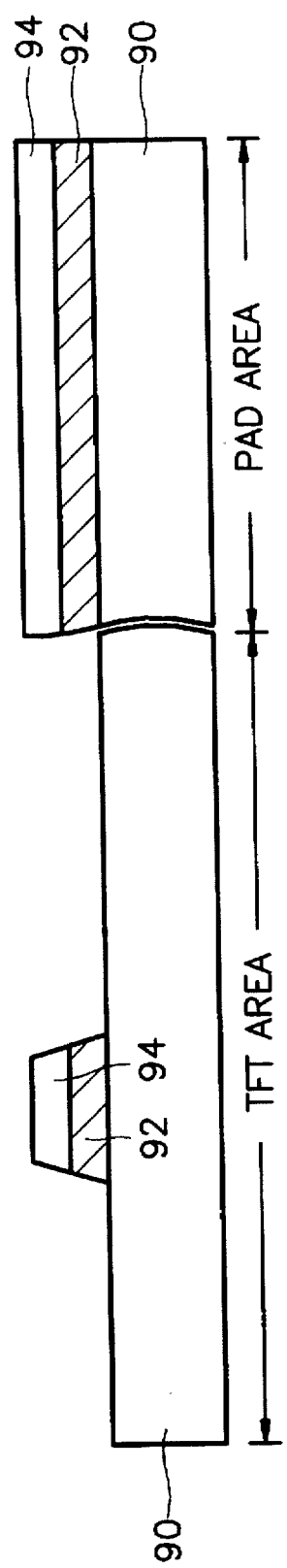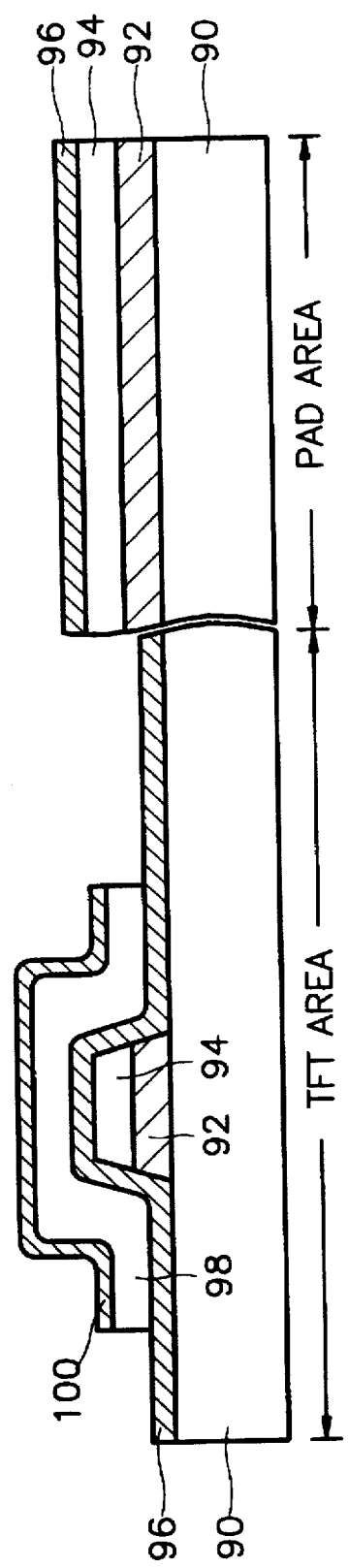

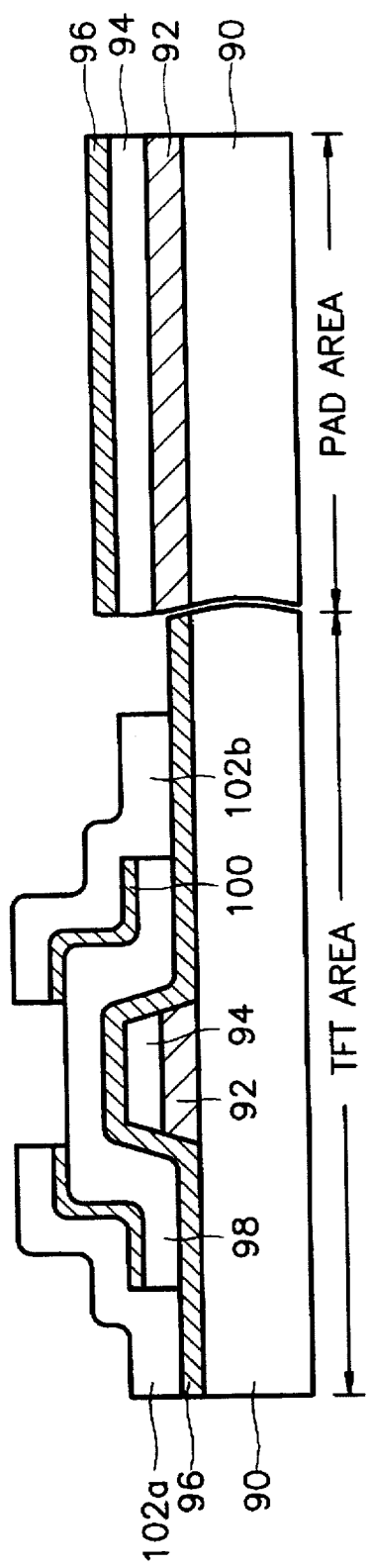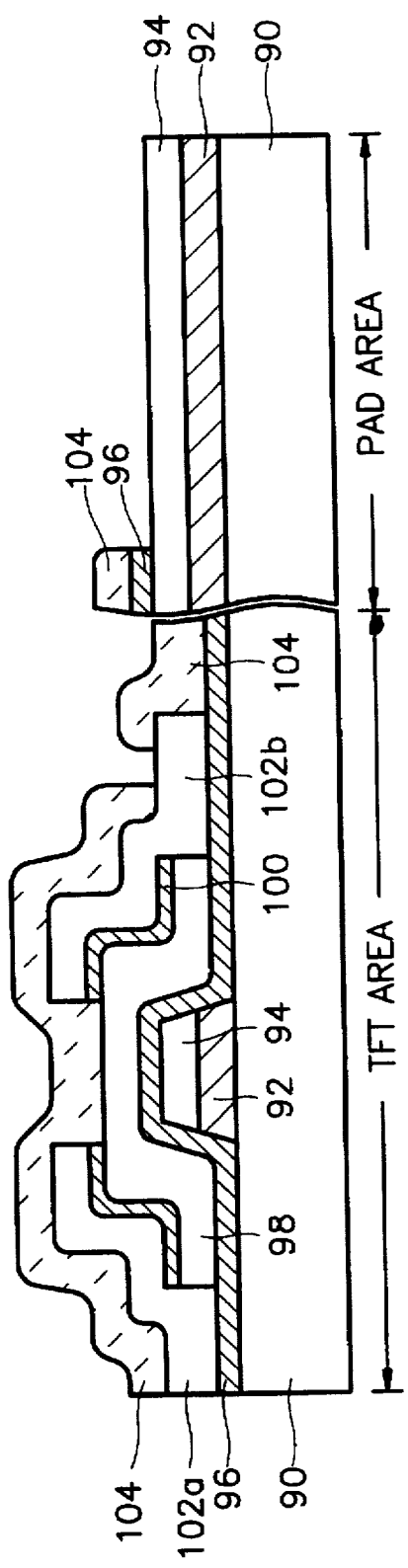

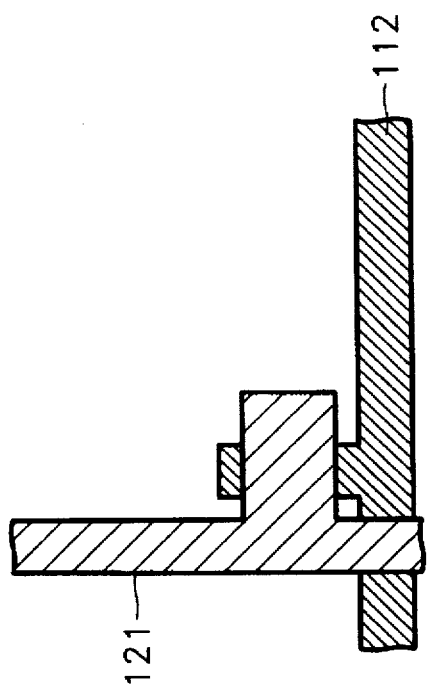
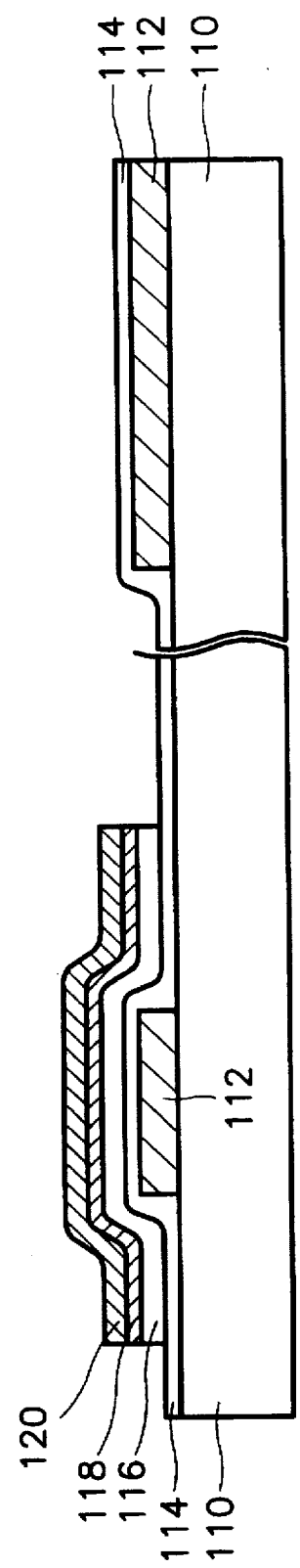
FIG. 16A
FIG. 16B

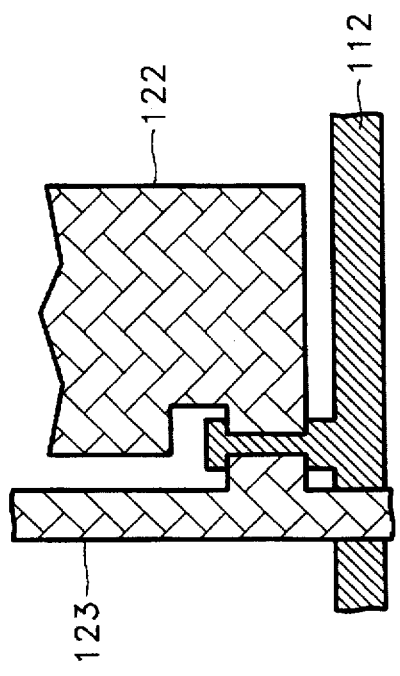
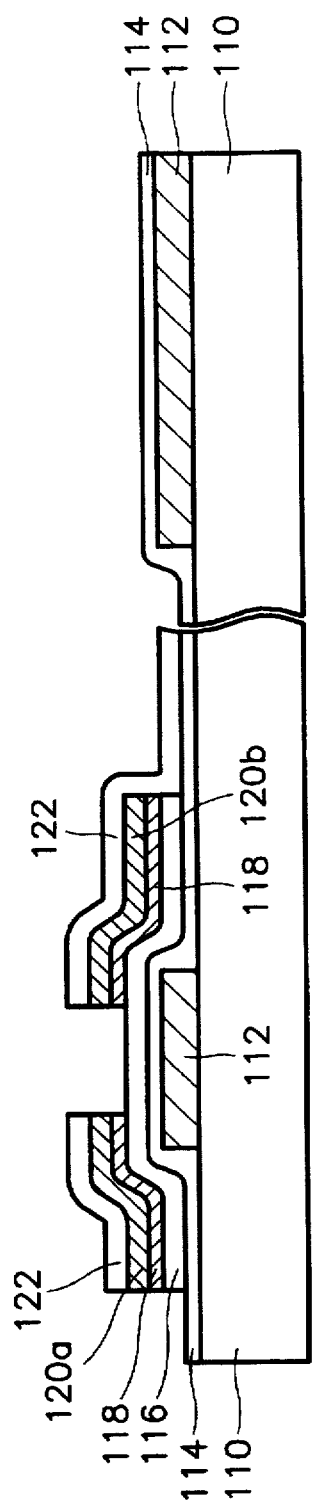
FIG. 17A
FIG. 17B

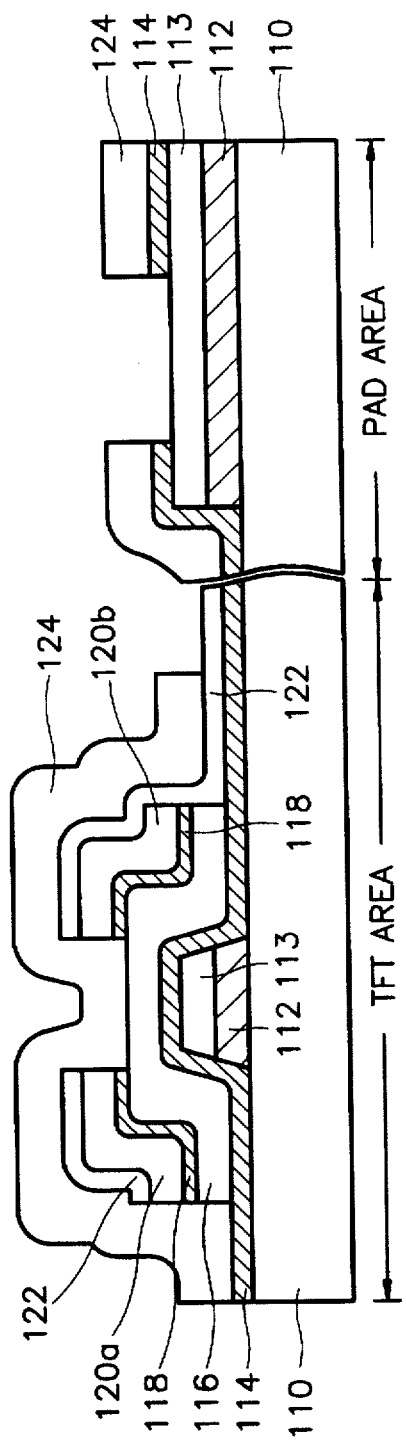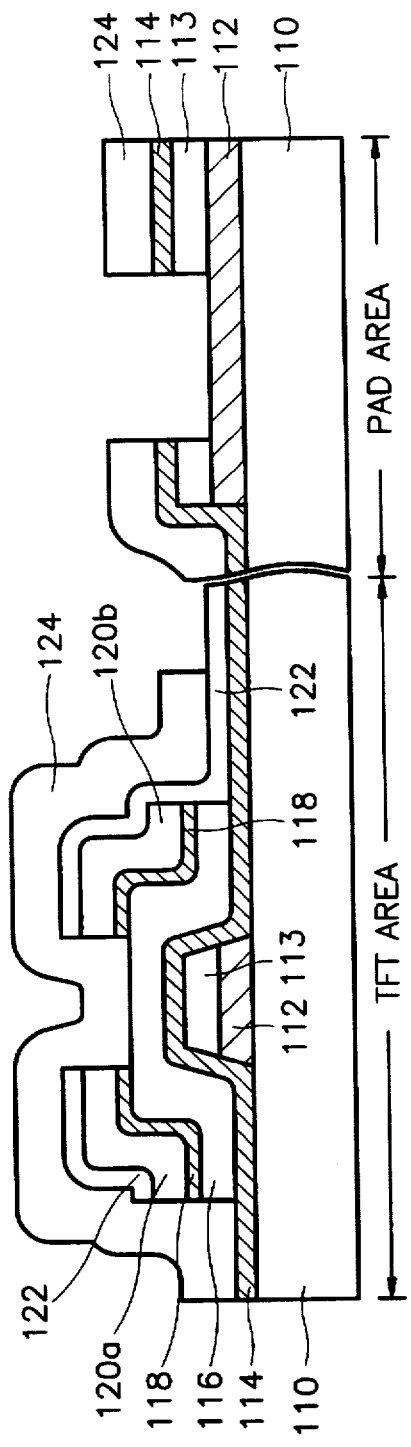

METHODS FOR FORMING LIQUID CRYSTAL DISPLAYS INCLUDING THIN FILM TRANSISTORS AND GATE PADS HAVING A PARTICULAR STRUCTURE

FIELD OF THE INVENTION

The present invention relates to the field of microelectronics and more particularly to methods for forming liquid crystal displays.

BACKGROUND OF THE INVENTION

Electro-optical devices are used to convert electrical signals into visual images so that information from an electronic system can be displayed to a human user. For example, liquid crystal displays (LCDs) are widely used as visual displays for computer systems. Other visual displays include plasma display panels (PDPs) which use plasma discharge, electroluminescence (EL) devices, field emission displays (FEDs), and reflex deformable mirror devices (DMDs) which use the controlled movement of a mirror.

A liquid crystal display is a flat display device which uses the optical characteristics of liquid crystal molecules wherein the arrangement of the liquid crystal molecules changes in response to an electrical field induced by microelectronic structures. In particular, thin film transistor liquid crystal displays (TFT-LCDs) use thin film transistors as active devices. The thin film transistors have the advantages of being driven at a low voltage, providing low power consumption, and being relatively thin and light weight.

Because a thin film transistor (TFT) may be thinner than a conventional transistor, methods used to manufacture a thin film transistor may be more complicated than methods used to manufacture conventional transistors. The manufacturing yield for a thin film transistor device may thus be relatively low, and the manufacturing cost may be relatively high. Accordingly, there exists a need in the art for methods for manufacturing thin film transistor liquid crystal displays having an increased manufacturing yield and a decreased cost. In particular, there is a need in the art for methods which reduce the number of masks used to manufacture the thin film transistor liquid crystal display.

A method for manufacturing a conventional liquid crystal display will now be described with reference to FIGS. 1A through 1D. A metal layer is forming by depositing aluminum (Al) on a transparent substrate 10, and this metal layer is patterned using a first photolithography step to form gate electrodes as shown in FIG. 1A. A photoresist mask is then formed on the pad area of the substrate using a second photolithography step, and the substrate is anodized to form an anodic oxide layer 13 on the gate electrode on the TFT area of the substrate. The photoresist mask prevents the formation of the anodic oxide on the gate on the pad area of the substrate. The photoresist mask is then removed.

An insulating layer 15, such as a nitride layer, is deposited on the substrate 10 including the gate electrodes 11 and the anodic oxide layer 13. An amorphous silicon layer 17 and a doped amorphous silicon layer 19 are sequentially deposited on the insulating layer 15 to provide a semiconductor layer. A third photolithography step is then performed on the semiconductor layer to provide the amorphous silicon layer 17 and the doped amorphous silicon layer 19, as shown in FIG. 1b.

A gate-pad connecting contact hole is formed in the insulating layer 15 using a fourth photolithography step thereby exposing a portion of the gate electrode 11 on the pad area of the substrate. A source electrode 21a and a drain electrode 21b are formed on the TFT are of the substrate by depositing a metal layer, such as a chromium (Cr) layer, on the substrate and patterning the metal layer using a fifth photolithography step. A pad electrode 21c is thus formed on the pad area of the substrate wherein the pad electrode is connected to the gate electrode 11 through the contact hole in the insulating layer 15. In addition, the doped amorphous silicon layer 19 on the upper portion of the gate electrode 11 is partially etched during the fifth photolithography step, thus exposing a portion of the amorphous silicon layer 17 on the gate electrode 11.

A protective layer 23 is formed by depositing an insulating material on the TFT area of the substrate covering the source and drain electrodes 21a and 21b. A contact hole is then formed in the protective layer 23 using a sixth photolithography step thereby exposing a portion of the drain electrode 23b as shown in FIG. 1D. As further shown, the protective layer is not formed on the pad area of the substrate.

A layer of a transparent conductive material such as indium tin oxide (ITO) is deposited on the substrate and patterned using a seventh photolithography step to thereby form a pixel electrode 25 as shown in FIG. 1D. The drain electrode 2b and the pixel electrode 25 are thus connected through the contact hole in the protective layer.

According to the method discussed above, seven photolithography steps are used to form a thin film transistor liquid crystal display. In particular, photolithography steps are used to pattern the gate electrode, form the anodic oxide layer, pattern the semiconductor layer, form the contact hole in the insulating layer, pattern the source and drain electrodes, form the contact hole in the protective layer, and pattern the pixel electrode. A relatively large number of photolithography masks are thus used thereby increasing the manufacturing time and cost, and decreasing production yield.

In addition, a hillock may form on the gate electrode during high temperature thermal treatments because pure aluminum is used as the gate electrode material. In particular, the hillock may form during the steps of forming the nitride layer, forming the amorphous silicon layer, or forming the doped amorphous silicon layer. Accordingly, there continues to exist a need in the art for methods for forming thin film transistors using a reduced number of photolithography steps.

FIG. 2 is a cross sectional view illustrating a thin film transistor liquid crystal display formed using five photolithography masks. The formation of this structure is discussed in Korean Patent Application No. 95-42618. As shown, this TFT-LCD includes a substrate 30, an aluminum alloy layer 32, a refractory metal capping layer 34, an insulating layer 36 which can be a nitride layer, an amorphous silicon layer 38, a doped amorphous silicon layer 40a, a source electrode 42a, a drain electrode 42b, a protective layer 44, and a pixel electrode 46.

The gate electrodes of FIG. 2 formed on the TFT and pad areas of the substrate have a double layer structure formed by sequentially depositing first and second metal layers 32 and 34. In particular, the first metal layer 32 includes aluminum or an aluminum alloy, and the second metal layer 34 includes a refractory metal such as chromium (Cr), Molybdenum (Mo), or Titanium (Ti). On the TFT area of the substrate, the pixel electrode 46 and the drain electrode 42b are connected through a contact hole in the protective layer 44. On the pad area of the substrate, the a contact hole through the protective layer 44 and the insulating layer 36 exposes a portion of the second metal layer 34. The contact hole is formed by simultaneously etching the protective layer 44 and the insulating layer 36. Accordingly, the pixel electrode 46 can be electrically connected to the gate electrode on the pad area of the substrate. Furthermore, the pixel can be formed by patterning a layer of indium tin oxide (ITO).

According to the method discussed above, the second metal layer 34 is patterned to provide a capping layer on the first metal layer 22 which can be a layer of aluminum or an aluminum alloy such as Al—Nd or Al—Ta. Accordingly, the use of the capping layer allows the elimination of the anodic oxide layer of FIGS. 1A–1D. In addition, the number of photolithography steps can be reduced by simultaneously etching both the insulating layer 36 and the protective layer 44.

FIG. 3 is a cross sectional view illustrating a second TFT-LCD formed according to a method using five photolithography masks. The method used to form the TFT-LCD of FIG. 3 is discussed in Korean Patent Application No. 95-62170. The TFT-LCD of FIG. 3 includes a substrate 50, a first metal layer 51 made up of a refractory metal, a second metal layer 53 made up of aluminum or an aluminum alloy, an insulating layer 55, an amorphous silicon layer 57, a doped amorphous silicon layer 59, a source electrode 61a, a drain electrode 61b, a pad electrode 61c, a protective layer 63, and a pixel electrode 67.

As shown, the gate electrodes formed on the TFT and pad areas of the substrate each have a double-layer structure formed by sequentially depositing a first metal layer 51 made of a refractory metal such as chromium (Cr), molybdenum (Mo), or titanium (Ti), and a second metal layer 53 made up of aluminum or an aluminum alloy. On the TFT area of the substrate, the pixel electrode 67 and the drain electrode 61b are connected through a contact hole in the protective layer 63. On the pad area of the substrate, the gate electrode (including the first and second metal layers 51 and 53) and the pad electrode 61c are connected by the pixel electrode 67. Moreover, the aluminum portion of the gate electrode on the pad area of the substrate can be etched where the gate electrode and the pixel electrode 67 make contact.

According to the method discussed above, the number of photolithography steps used can be reduced. In addition, by forming gate electrodes including an aluminum or aluminum alloy layer on a refractory metal layer, the growth of aluminum hillocks can be reduced. Furthermore, the contact resistance between the pixel electrode and the gate electrode on the pad area of the substrate can be reduced by etching the aluminum portion of the gate electrode before forming the pixel electrode thereon.

Disadvantages of the above mentioned methods will now be discussed with reference to FIG. 4 which illustrates a layout for the pad area used to form the LCDs of FIGS. 2 and 3. In particular, the layout includes a mask pattern M1 for patterning the pad electrode, a mask pattern M2 for forming the contact hole for connecting the pixel electrode and the pad electrode, and a mask pattern M3 for patterning the pixel electrode.

First, when forming the pad electrode on the pad area of the substrate, as discussed above with regard to FIG. 2, using a refractory metal/Al (or Al alloy) structure, Al and ITO are in direct contact at a portion A, as shown in FIG. 4. If Al and ITO are in direct contact, however, the ITO may dissolve in a developing solution due to a battery effect caused by a developing solution used during the step of patterning the ITO layer. Second, an oxide layer may form as a result of driving currents used to drive the LCD. When forming the pad electrode using an Al (or Al alloy)/refractory metal structure as discussed above with regard to FIG. 3, Al and ITO may come into direct contact at a portion B if Al (or Al alloy) on the pad electrode is etched after etching the protective layer and insulating layer.

Third, the ITO in the pad area may overlap with that in an upper substrate having a color filter formed thereon, and the two ITO electrodes may thus be shorted by conductive particles therebetween. Fourth, since the insulating layer and the protective layer are simultaneously etched to provide a contact hole for connecting the gate electrode and pad electrode in the pad area of the substrate, the etched portions of the insulating layer and protective layer may be nearly perpendicular to the substrate. Accordingly, poor step coverage may result during a later step of depositing an ITO layer. Fifth, since the protective layer and the insulating layer are opened over several pads in a box shape, the substrate between the pads may be etched when dry-etching the protective layer and the insulating layer.

SUMMARY OF THE INVENTION

It is therefore an object of the present invention to provide improved methods for forming liquid crystal displays.

It is another object of the present invention to provide methods for forming liquid crystal displays having improved reliability.

It is still another object of the present invention to provide methods for forming liquid crystal displays using a reduced number of photolithography steps.

These and other objects are provided according to the present invention by methods including the steps of depositing a first metal layer on a substrate and depositing a second metal layer on the first metal layer opposite the substrate. The first and second metal layers are patterned to provide a gate electrode on a TFT area of the substrate and to provide a gate pad on a pad area of the substrate. An insulating layer is formed on the gate electrode, on the gate pad, and on the substrate. A semiconductor layer is formed on the insulating layer opposite the gate electrode wherein the semiconductor layer includes a channel region opposite the gate electrode and first and second spaced apart source/drain regions separated by the channel region.

First and second spaced apart metal source/drain electrodes are then formed on the respective first and second spaced apart semiconductor source/drain regions, and a protective layer is formed on the exposed portion of the first semiconductor layer opposite the substrate, on the first and second metal source/drain electrodes opposite the substrate, and on the insulating layer opposite the gate pad. A first contact hole is formed in the protective layer exposing a portion of one of the source/drain electrodes, and a second contact hole is formed in the protective layer and the insulating layer exposing a portion of the gate pad wherein the second contact hole exposes only a surface portion of the gate pad opposite the substrate. A transparent conductive layer is formed on the protective layer opposite the substrate, and the transparent conductive layer is patterned to form a pixel electrode electrically connected to the exposed portion of the source/drain electrode and to the exposed portion of the gate pad.

In addition, the first metal layer can include a material such as aluminum or an aluminum alloy, and the second metal layer can include a refractory metal. The pixel electrode can cover the exposed surface portion of the gate pad and extend onto the protective layer adjacent the second contact hole. Furthermore, the step of forming the semiconductor layer can include forming a semiconductor layer portion on the insulating layer opposite the pad area of the substrate so that the semiconductor layer portion is adjacent the second contact hole. The step of forming the metal source/drain electrodes can also include forming a metal layer portion on the insulating layer opposite the pad area of the substrate so that the metal layer portion is adjacent the second contact hole.

According to an alternate aspect of the present invention, a method for forming a liquid crystal display includes the steps of depositing a first metal layer on a substrate, and depositing a second metal layer on the first metal layer opposite the substrate. The first and second metal layers are patterned to provide a gate electrode on a T FT area of the substrate and to provide a gate pad on a pad area of the substrate. An insulating layer is formed on the gate electrode and on the gate pad, and on the substrate. A semiconductor layer is formed on the insulating layer opposite the gate electrode wherein the semiconductor layer includes a channel region opposite the gate electrode and first and second spaced apart source/drain regions separated by the channel region.

First and second spaced apart metal source/drain electrodes are formed on the respective first and second spaced apart semiconductor source/drain regions, and a protective layer is formed on the exposed portion of the first semiconductor layer opposite the substrate, on the first and second metal source/drain electrodes opposite the substrate, and on the insulating layer opposite the gate pad. A first contact hole is formed in the protective layer exposing a portion of one of the source/drain electrodes, and a second contact hole is formed in the protective layer and the insulating layer exposing a portion of the gate pad wherein the second contact hole exposes portions of surface portions of the gate pad opposite the substrate and portions of the substrate adjacent the gate pad. A transparent conductive layer is formed on the protective layer opposite the substrate, and the transparent conductive layer is patterned to form a pixel electrode electrically connected to the exposed portion of the source/drain electrode and the gate pad.

According to another alternate aspect of the present invention, a method for forming a liquid crystal display includes the steps of forming a first metal layer on a substrate, and patterning the first metal layer to provide a gate electrode on a TFT area of the substrate and to provide a gate pad on a pad area of the substrate. An insulating layer is formed on the gate electrode and on the gate pad, and a patterned semiconductor layer is formed on the insulating layer opposite the gate electrode and opposite the gate pad. A second patterned metal layer is formed on the semiconductor layer opposite the insulating layer, and a transparent conductive layer is formed on the second patterned metal layer and on the insulating layer opposite the substrate. The transparent conductive layer, the second patterned metal layer, and the patterned semiconductor layer are patterned to provide a data line, metal source/drain electrodes, and a pixel electrode.

The methods of the present invention thus allow the manufacture of liquid crystal displays with a reduced number of photolithography steps. Accordingly, the cost and complexity of manufacture can be reduced, and the manufacturing yield can be increased.

BRIEF DESCRIPTION OF THE DRAWINGS

FIGS. 1A through 1D are cross sectional views illustrating steps of a method for forming an LCD according to the prior art.

FIGS. 11A through 11E are cross sectional views illustrating steps of a method for forming an LCD according to the second embodiment of the present invention.

FIG. 19 is a cross sectional view illustrating a method for forming an LCD according to an eighth embodiment of the present invention.

FIG. 20 is a cross sectional view illustrating a method for forming an LCD according to a ninth embodiment of the present invention.

DETAILED DESCRIPTION

Figure 1C:
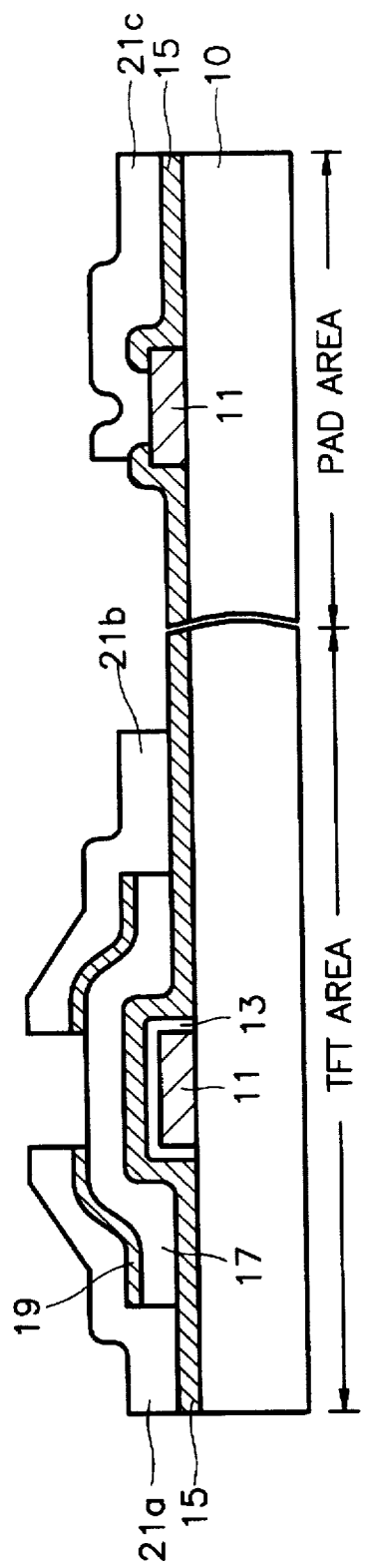
Figure 1D:
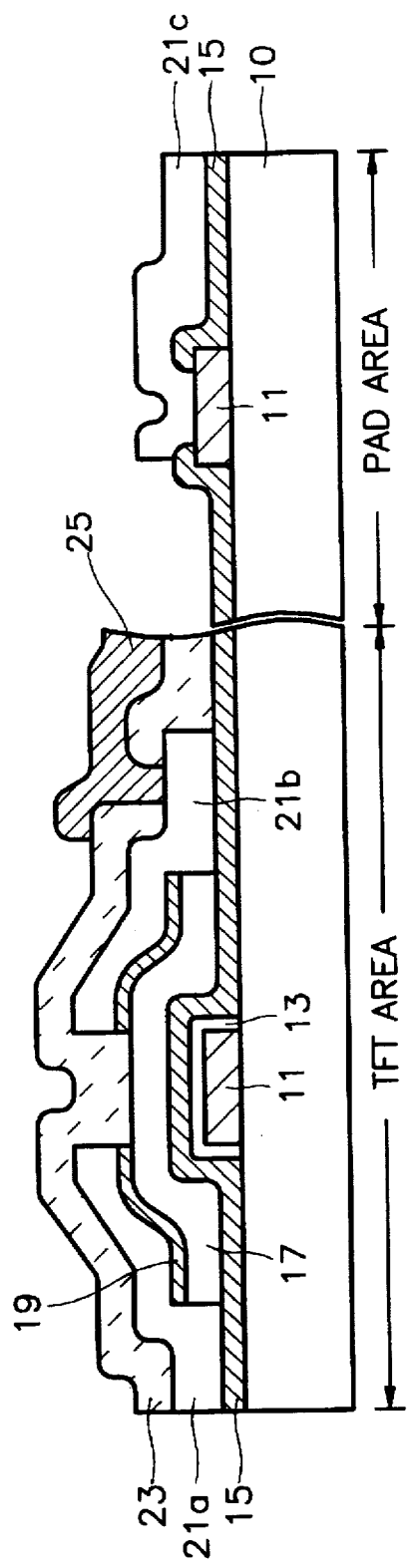
Figure 2:
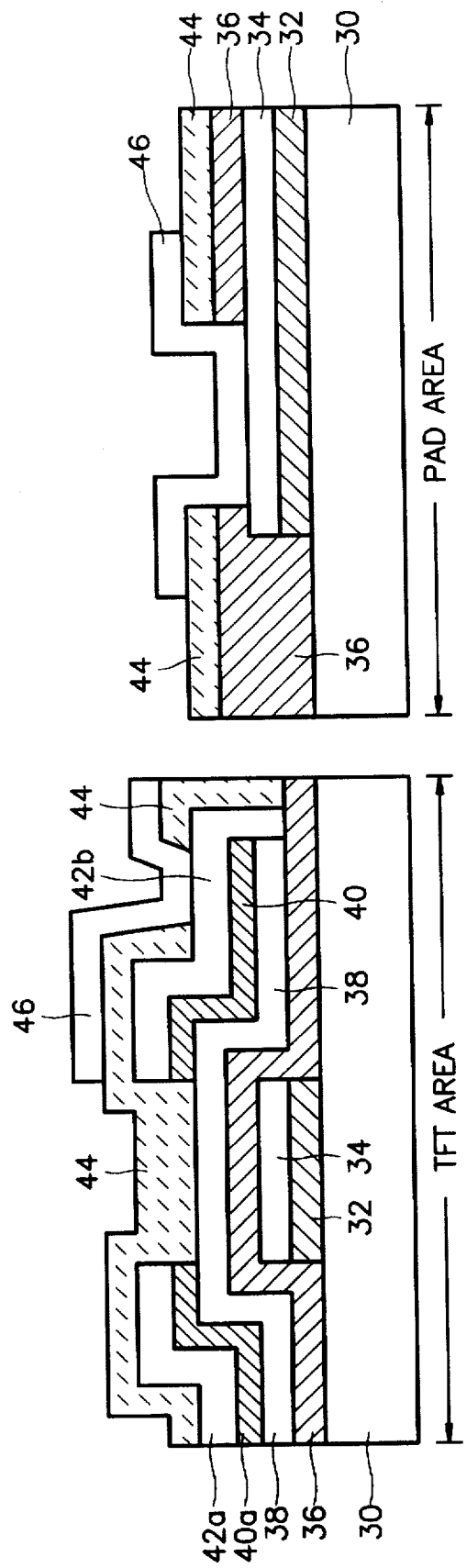
FIGS. 2 and 3 are cross sectional views illustrating examples of TFT-LCDs formed by methods according to the prior art using five masks.
Figure 3:
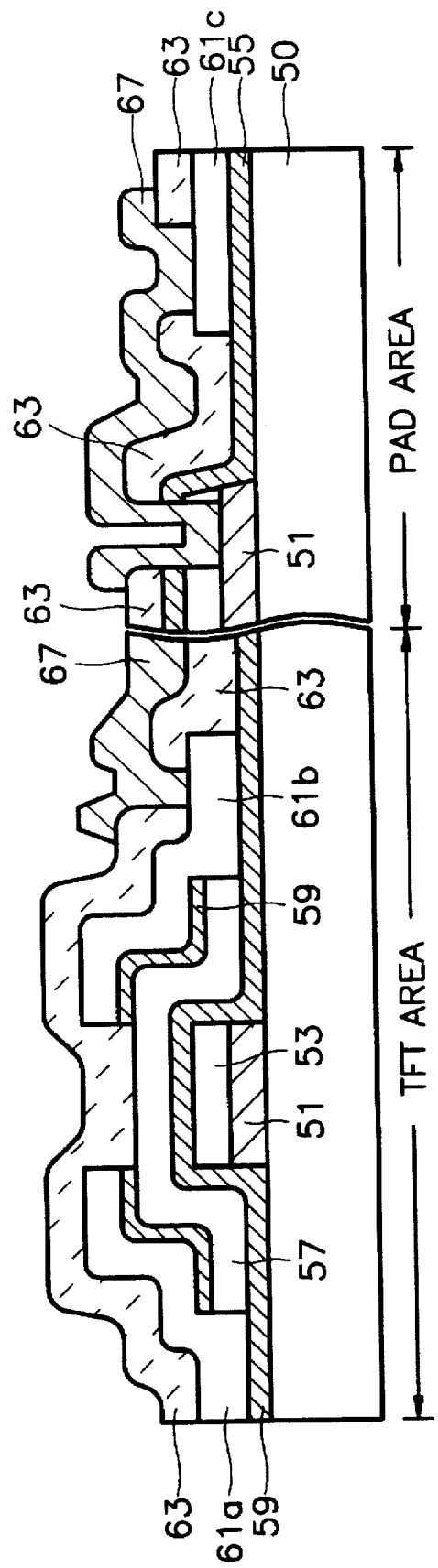
Figure 4:
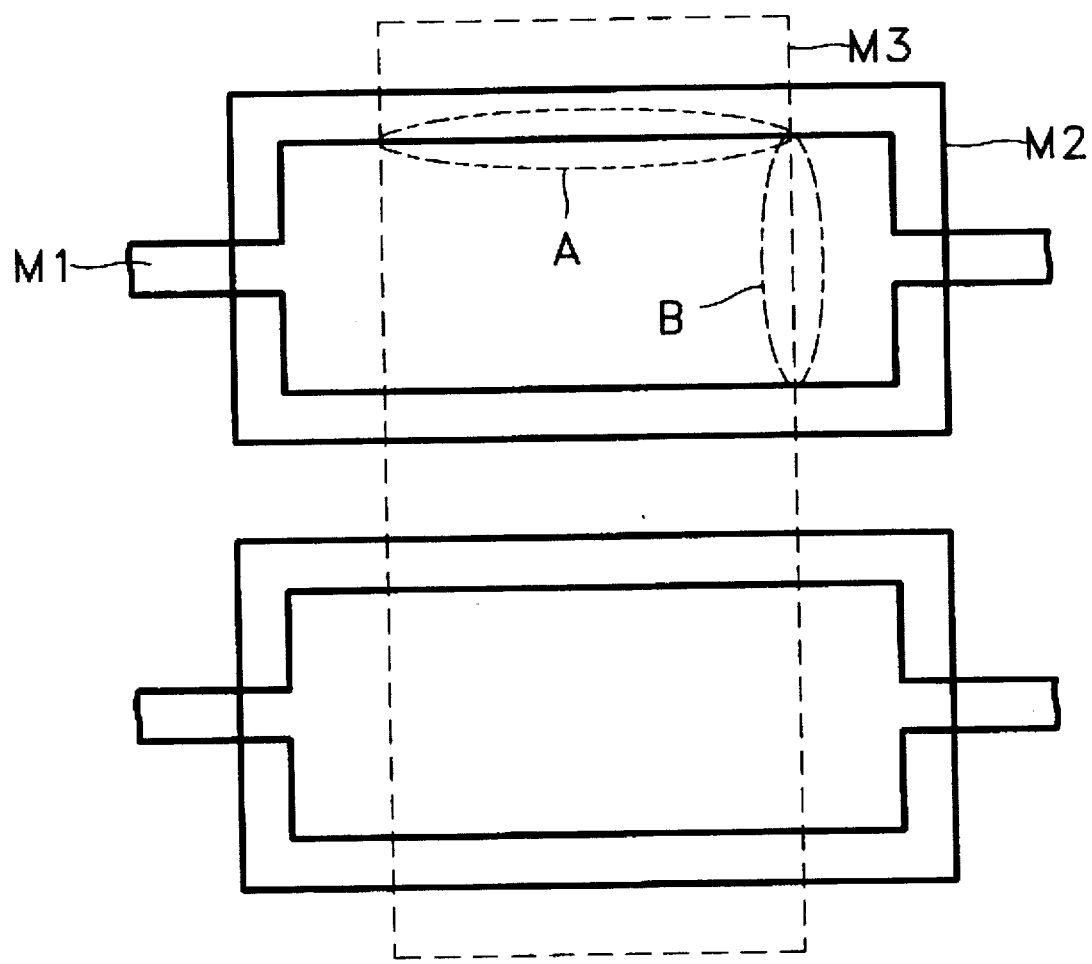
FIG. 4 is a schematic plan view of a pad area for forming the LCDs of FIGS. 2 and 3.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thicknesses of layers and regions are exaggerated for clarity. Like numbers refer to like elements throughout. It will also be understood that when a layer is referred to as being "on" another layer or substrate, it can be directly on the other layer or substrate, or intervening layers may also be present.

Figure 5:
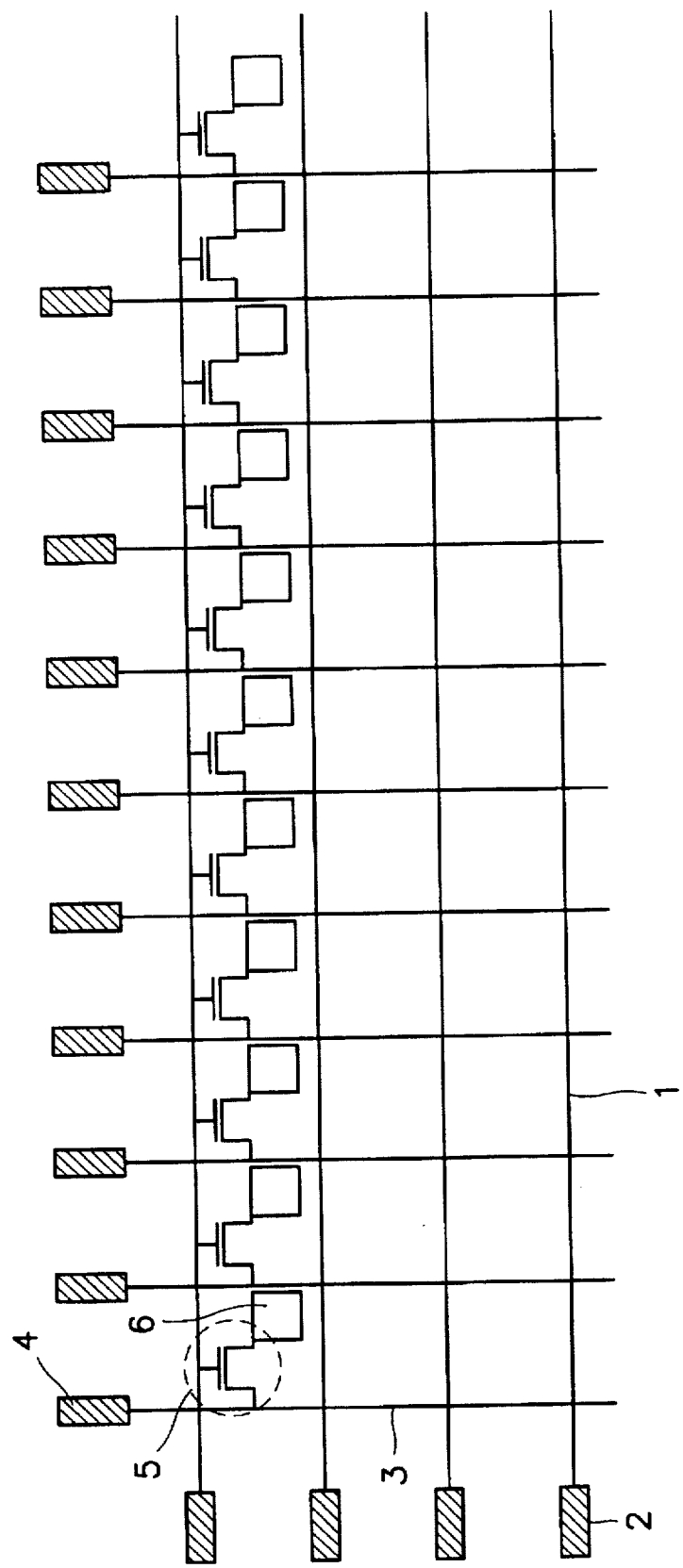
FIG. 5 is a plan view illustrating an LCD formed using a method according to the present invention.

FIG. 5 is a plan view illustrating an LCD manufactured according to a method of the present invention. Referring to FIG. 5, a plurality of gate lines 1 are provided laterally, and a respective gate pad 2 is provided at the end of each of the gate lines 1. A thin film transistor 5 and a pixel electrode 6 are connected to each of the gate lines 1. Also, a plurality of data lines 3 are provided lengthwise, and a respective data pad 4 is provided at the end of each of the data lines 3. A pixel is thus defined in the area surrounded by two adjacent data lines and two adjacent gate lines.

Figure 6:
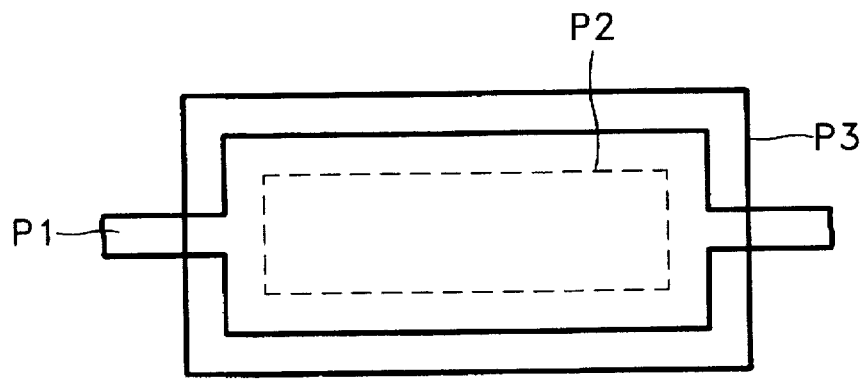
FIG. 6 is a schematic plan view illustrating a pad area for forming an LCD using a method according to a first embodiment of the present invention.

FIG. 6 is a schematic plan view of a pad area, and this figure is used to explain a method for forming an LCD according to a first embodiment of the present invention. In particular, the reference character P1 denotes a mask pattern used to pattern a pad electrode. The reference character P2 denotes a mask pattern used to form a contact hole connecting a pixel electrode and the pad electrode by etching an insulating layer and a protective layer. Reference character P3 denotes a mask pattern used to pattern the pixel electrode.

Referring to FIG. 6, the protective layer and the insulating layer of a pad area are arranged to be etched within the boundary of a gate pad pattern. Contact of an Al layer and an ITO layer due to exposure of the Al layer is thus reduced. In addition, the pixel electrode is arranged to be larger than the etched portion of the protective layer and insulating layer, thereby protecting the second metal layer by the ITO layer.

Figure 7A:
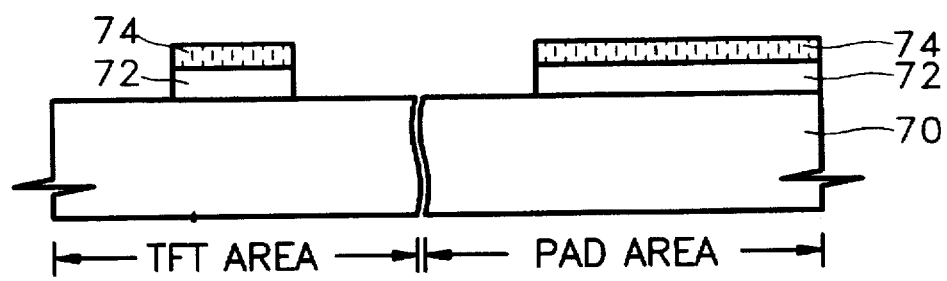
FIGS. 7A through 7E are cross sectional views illustrating steps of a method for forming an LCD according to the first embodiment of the present invention.

FIGS. 7A through 7E are cross sectional views illustrating steps of a method for forming an LCD according to a first embodiment of the present invention. Referring to FIG. 7A, a first metal layer 72 is formed by depositing Al or an Al alloy on a transparent substrate 70. A refractory layer is then deposited on the first metal layer 72 to form a second metal layer 74. Subsequently, a gate electrode is formed on a TFT area of the substrate and a gate pad is formed on a pad area of the substrate, by performing a first photolithography step on the second metal layer 74 and first metal layer 72.

Figure 7B:
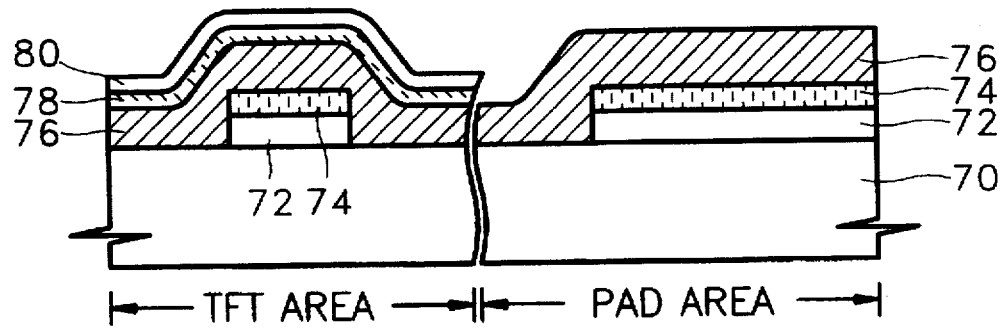

Referring to FIG. 7B, a nitride layer is deposited on the entire surface of the substrate 70 where the gate electrode and pad electrode are formed, to form an insulating layer 76. Next, after forming a semiconductor layer comprising an amorphous silicon layer 78 and a doped amorphous silicon layer on the insulating layer 76, a patterned semiconductor layer including layers 78 and 80 is formed on the TFT area of the substrate by performing a second photolithography step on the semiconductor layer.

Figure 7C:
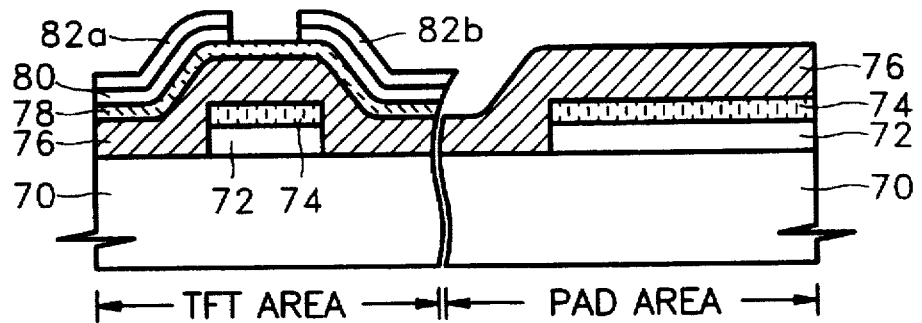

Referring to FIG. 7C, a third metal layer is formed by depositing a metal such as chromium (Cr), molybdenum (Mo), or titanium (Ti) on the patterned semiconductor layer including layers 78 and 80 opposite the substrate 70. A source electrode 82a and a drain electrode 82b are then formed on the TFT area of the substrate by performing a third photolithography step on the third metal layer. At this time, the doped amorphous silicon layer 80 is also etched to expose a portion of the amorphous silicon layer 78 thereby defining a channel for the thin film transistor.

Figure 7D:
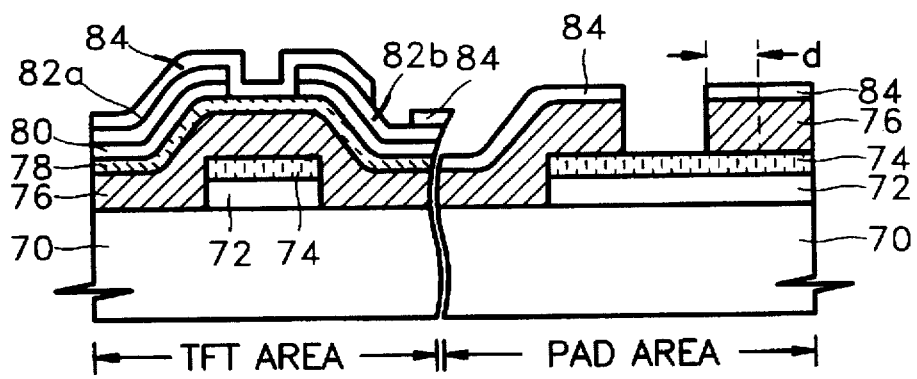

Referring to FIG. 7D, a protective layer is formed by depositing a nitride layer on the entire surface of the substrate including the source electrode 82a and the drain electrode 82b. The protection layer 84 is then patterned by performing a fourth photolithography step on the protective layer. A first contact hole is formed in the protective layer thereby exposing a portion of the drain electrode 82b, and a second contact hole is formed in the protective layer 84 and the insulating layer 76 thereby exposing a portion of the second metal layer 74.

More particularly, portions of the insulating layer 76 and the protective layer 84 on the pad area of the substrate are patterned to be opened within the boundary of the gate pad pattern, as shown in FIG. 6. By doing so, the Al layer is not exposed so that it does not contact an ITO layer to be formed in a later manufacturing step. In addition, the protective layer 84 and the insulating layer 76 are patterned with a predetermined distance d set for preventing a portion where the protective layer 84 and insulating layer 76 are opened from overlapping with the ITO layer (formed at a later step) of the upper substrate where a color filter is formed. Electrical shorts due to conductive particles between the ITO layer for a pixel electrode to be formed in a later step and that of the color filter substrate can be reduced.

Figure 7E:
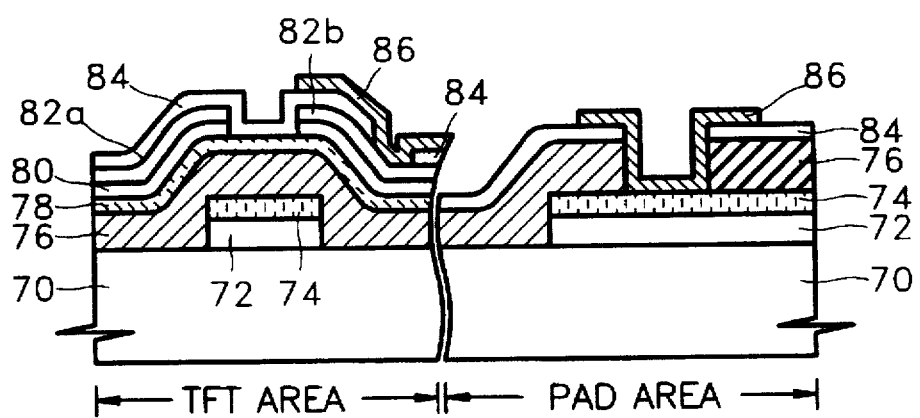

Referring to FIG. 7E, an ITO layer, which is a transparent conductive layer, is formed on the entire surface of the substrate where the protective layer 84 is formed. This ITO layer is patterned using fifth photolithography and etch steps to provide a pixel electrode 86 connected to the gate pad including layers 72 and 74 on the pad area of the substrate and connected to the drain electrode on the TFT area of the substrate.

According to the aforementioned first embodiment of the present invention, the number of required masks can be reduced and aluminum hillock growth can be reduced by forming a gate electrode with a double-layer structure using a refractory metal with aluminum or an aluminum alloy. In addition, when forming a contact hole for connecting a pixel electrode and a gate pad by simultaneously etching an insulating layer and a protective layer, the contact between aluminum and ITO can be reduced by opening the insulating layer and protective layer within the boundary of a gate pad pattern. The pixel electrode formed on the pad area of the substrate can also be patterned larger than the opened portion of the protective layer and insulating layer, thereby protecting the second metal layer with the ITO layer.

Figure 8:
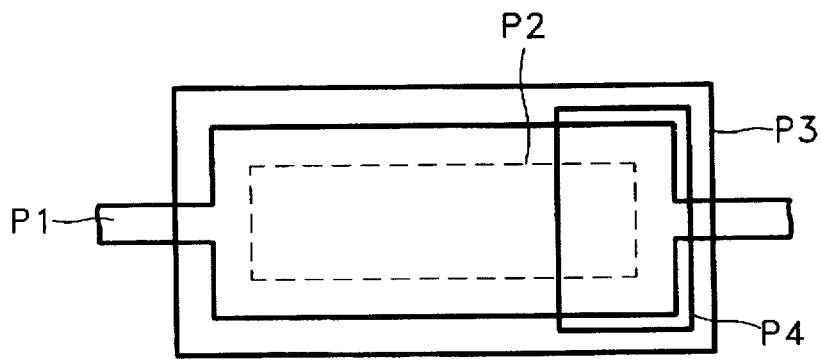
FIG. 8 is a schematic plan view illustrating a method for forming an LCD according to a second embodiment of the present invention.
Figure 9:
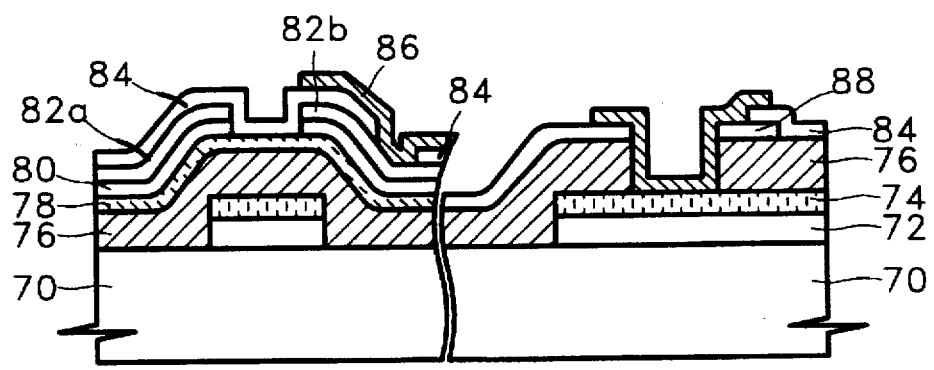
FIG. 9 is a cross sectional view illustrating an LCD formed using a method according to the second embodiment of the present invention.

FIG. 8 is a schematic plan view for illustrating an LCD formed using a method according to a second embodiment of the present invention, and FIG. 9 is a cross sectional view illustrating an LCD formed using a method according to the second embodiment of the present invention. In FIG. 8, the reference character P4 denotes a mask pattern for defining a region where a first material layer is formed to improve a step coverage of the etched portion of the protective and insulating layers.

Referring to FIG. 9, the gate electrode is formed with a double-layer structure including a refractory metal and aluminum (or an aluminum alloy), and the insulating layer and protective layer on the pad area are patterned to be opened within the boundary of the gate pad pattern on the pad area of the substrate. In addition, a first material layer 88 is formed on the insulating layer in the etched portion of the protective layer and insulating layer on the pad area of the substrate, and this first material can improve step coverage. The first material layer 88 is formed by patterning the semiconductor layer so that a portion thereof is left at the boundary portion where the protective layer and the insulating layer are etched. Alternately, the first material layer can be formed when patterning the source electrode and drain electrode so that a portion of the metal layer is left at the boundary portion where the protective layer and the insulating layer are etched. Therefore, the step coverage of the ITO layer for the pixel electrode can be improved without a separate photolithography step.

Figure 10:
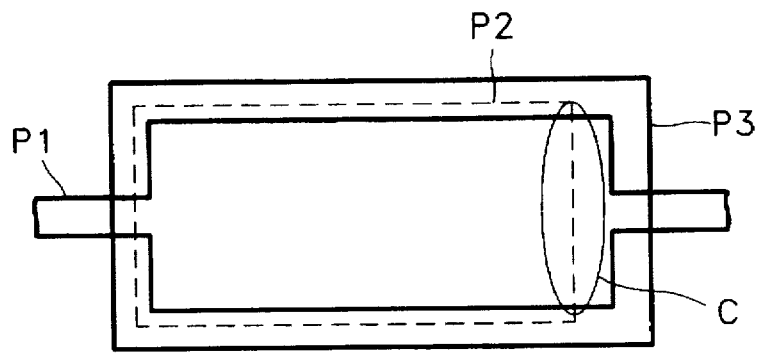
FIG. 10 is a plan view illustrating a method for forming an LCD according to a third embodiment of the present invention.

FIG. 10 is a schematic plan view illustrating the pad area of an LCD formed by a method according to a third embodiment of the present invention. In particular, the contact hole in the protective layer and the insulating layer is opened larger than the gate pad pattern thereby exposing more than just the gate pad. In addition, the ITO layer is patterned to be larger than the contact hole so that the ITO layer extends over portions of the protective and insulating layers. Accordingly, etching of the substrate is reduced, and the aluminum or aluminum alloy layer is exposed only at a portion C.

Figure 11E:
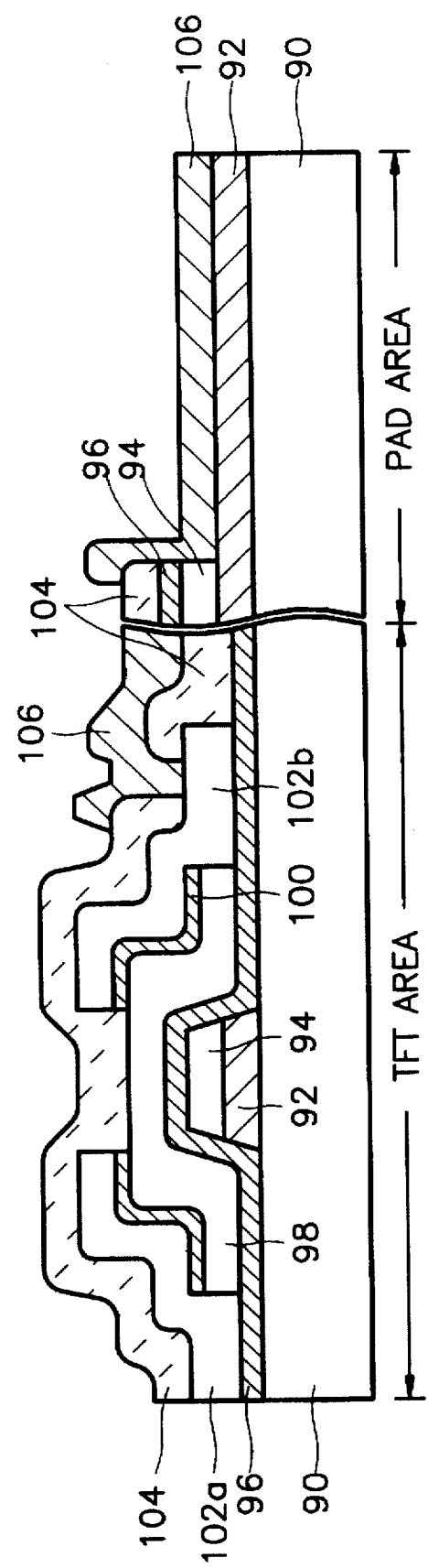

FIGS. 11A through 11E are cross sectional views illustrating steps of a method for forming an LCD according to the second embodiment of the present invention. Referring to FIG. 11A, a first metal layer 92 is formed by depositing a refractory metal such as Cr, Mo, Ta, or Ti, on a transparent substrate 90. Then, a second metal layer 94 is formed by depositing Al or an Al alloy on the first metal layer Subsequently, a gate electrode is formed on a TFT area of the substrate and a gate pad is formed on a pad area of the substrate by performing a first photolithography step on the second metal layer and the first metal layer.

Referring to FIG. 11B, an insulation layer 96 is formed by depositing a nitride layer on the entire surface of the substrate including the gate electrode. A semiconductor layer, including an amorphous silicon layer 98 and a doped amorphous silicon layer 100, is then formed on the entire surface of the substrate including the nitride layer. Next, the semiconductor layer is patterned to define an active region thereof on the TFT area of the substrate by performing a second photolithography step.

Referring to FIG. 11C, a third metal layer is formed by depositing a metal such as Cr, Ti or Mo on the entire surface of the substrate including the patterned semiconductor layer. A source electrode 102a and a drain electrode 102b are then formed on the TFT area of the substrate by performing a third photolithography step on the third metal layer. At this time, the doped amorphous silicon layer 100 opposite the gate electrode is also etched to expose the surface of the underlying amorphous silicon layer 98.

Referring to FIG. 11D, a protective layer is formed by depositing a nitride layer on the entire surface of the substrate including the source electrode 102a and the drain electrode 102b. The protective layer 104 is then patterned by performing a fourth photolithography step. At this time, a portion of the protective layer on the drain electrode 102b is partially etched to expose a portion of the drain electrode 102b. In addition, portions of the protective layer 104 and the insulating layer 96 on the gate pad area of the substrate are etched to expose the surface of the gate pad.

Referring to FIG. 11E, the exposed portion of the second metal layer 94 on the pad area of the substrate is etched to reduce a contact resistance between the pixel electrode and the gate pad. A layer of a transparent conductive material such as ITO is formed on the entire surface of the substrate including the partially etched second metal layer 94, and the pixel electrode 106 is formed by performing a fifth photolithography step on the ITO layer. Accordingly, the drain electrode 102b and the pixel electrode 106 are connected on the TFT area of the substrate. In the pad areas the gate pad (including the first metal layer 92 and the second metal layer 94) and the pixel electrode 106 are connected on the pad area of the substrate.

According to the aforementioned third embodiment of the present invention, the LCD can be manufactured using only five photolithography masks. In addition, aluminum hillock growth can be reduced by forming a gate electrode with a double-layer structure including a refractory metal layer and an aluminum or aluminum alloy layer deposited thereon. The contact resistance between the pixel electrode and the gate pad can be reduced by etching the exposed aluminum portion of the gate pad before depositing the ITO layer for the pixel electrode. The protective layer and the insulating layer are also opened to be larger than the gate pad pattern, thereby reducing the etching of the substrate when patterning the gate pad. The portion of the gate pad exposed by the opening in the protective and insulating layer can be protected by forming the pixel electrode to be larger than the opening in the protective and insulating layers.

Figure 12:
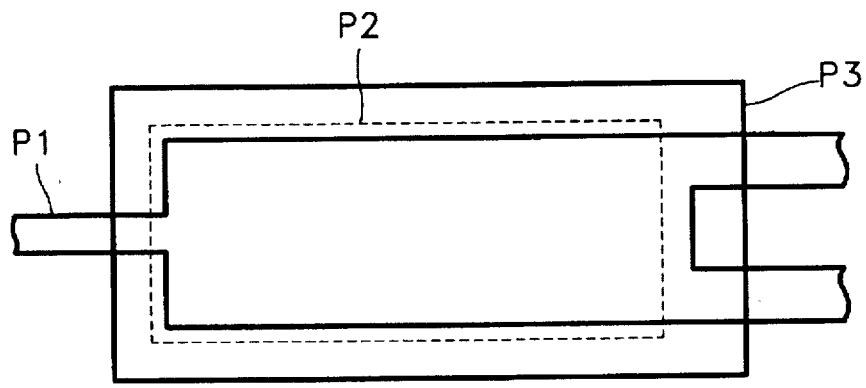
FIGS. 12 through 14 are plan views illustrating methods for forming an LCD according to fourth, fifth, and sixth embodiments of the present invention.

FIG. 12 is a schematic plan view illustrating an LCD formed by a method according to a fourth embodiment of the present invention. As shown in FIG. 12, the contact portion between the aluminum layer and the pixel electrode, which is defined by the opening in the protective layer and the insulating layer, is reduced by forming one end portion of the gate pad with a plurality of interconnections. In addition, the one end portion of the gate pad can be used as a redundancy interconnection.

Figure 13:
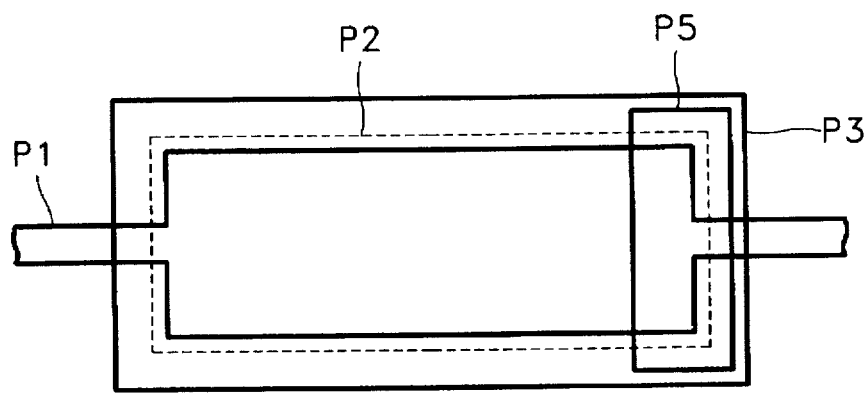

FIG. 13 is a schematic plan view illustrating an LCD formed by a method according to a fifth embodiment of the present invention. Like the third embodiment, the gate electrode is formed with a double-layer structure of aluminum (or an aluminum alloy) and a refractory metal, the insulating layer and protective layer are opened to be larger than the gate pad pattern, and the pixel electrode is formed to be larger than the portion of the opened insulating and protective layers. Furthermore, a mask pattern P5 is provided for forming a first material layer for improving the step coverage during the formation of the ITO layer for the pixel electrode on the etched portion of the protective layer and insulating layer on the pad area of the substrate.

As described in the second embodiment of the present invention, the first material layer P5 is formed by patterning the semiconductor layer so that a portion thereof is left at a boundary portion where the protective layer and insulating layer are etched on the pad area of the substrate. Alternately, the third metal layer can be patterned so that a portion thereof is left at a boundary portion where the protective layer and insulating layer are etched on the pad area of the substrate when forming the source and drain electrodes using the third metal layer. Accordingly, the step coverage of the ITO layer for the pixel electrode can be improved without adding a photolithography step.

Figure 14:
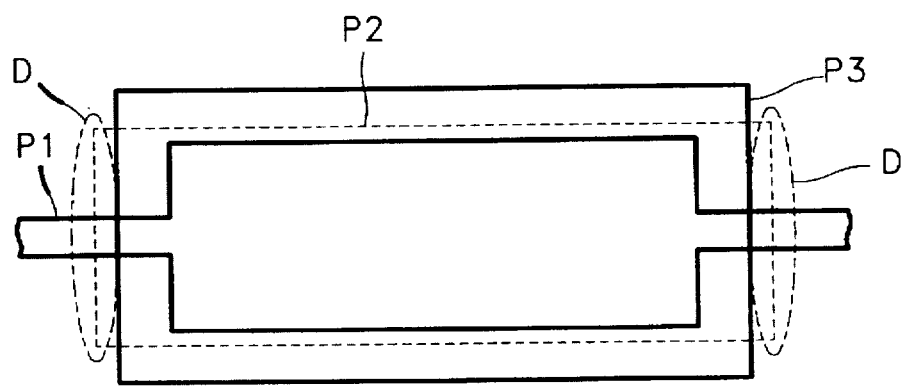

FIG. 14 is a schematic plan view illustrating a pad area of an LCD formed by a method according to a sixth embodiment of the present invention, wherein the insulating layer and protective layer are opened to be larger than the gate pad pattern. In addition, the ITO layer for the pixel electrode is arranged not to be formed in the etched portion of the second metal layer. Accordingly, the ITO layer for a pixel electrode is etched at a portion D so that the aluminum layer does not contact the ITO layer.

Figure 15A:
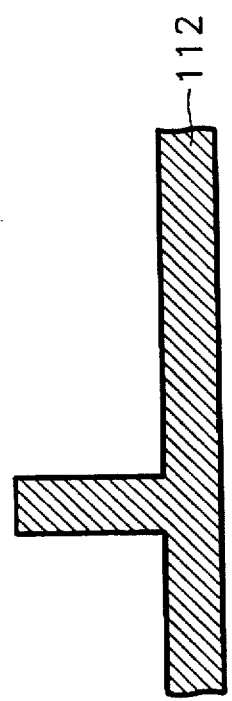
FIGS. 15A–B through 18A–B are corresponding plan and cross sectional views illustrating steps of a method for forming an LCD according to a seventh embodiment of the present invention.
Figure 15B:
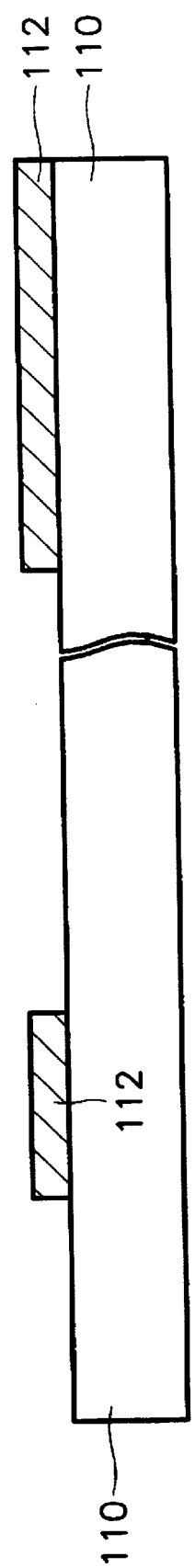

FIGS. 15A–B through 18A–B are plan and cross sectional views illustrating steps of a method for forming an LCD according to a seventh embodiment of the present invention. Referring to FIGS. 15A and 15B, a first metal layer is formed by depositing a metal such as Cr, Al, Ta or Mo on a transparent substrate 110 to a thickness in the range of 2,000 Å to 4,000 Å. A gate pattern 112 is then formed by performing a first photolithography step on the first metal layer. The gate pattern 112 can be used as a gate electrode, a gate interconnection, a gate pad electrode, or an additive capacitance electrode for a thin film transistor (TFT).

Referring to FIGS. 16A and 16B, an insulating layer 114 is formed by depositing a nitride layer or an oxide layer to a thickness in the range of 3,000 Å to 4,000 Å on the entire surface of the substrate 110 where the gate pattern 112 is formed. Next, a semiconductor layer is formed by depositing an amorphous silicon layer 116 and a doped amorphous silicon layer 118 over the substrate 112 where the insulating layer 114 is formed. A second metal layer 120 is then formed on the doped amorphous silicon layer 118 by depositing one metal selected from the group consisting of Cr, Al, Ta, Mo and Ti. Subsequently, the second metal layer and the semiconductor layer are patterned by performing a second photolithography step sequentially on the second metal layer 120, the doped amorphous silicon layer 118, and the amorphous silicon layer 116.

Referring to FIGS. 17A and 17B, a transparent conductive layer such as an ITO layer is formed on the entire surface of the substrate 110 including the second metal layer and the semiconductor layer. Subsequently, a data line 123, a source electrode 120a, a drain electrode 120b, and a pixel electrode 122 are formed by performing a third photolithography step on the transparent conductive layer, the second metal layer 120, and the doped amorphous silicon layer 118. At this time, the amorphous silicon layer 116 over the gate pattern 112 is partially exposed.

Figure 18A:
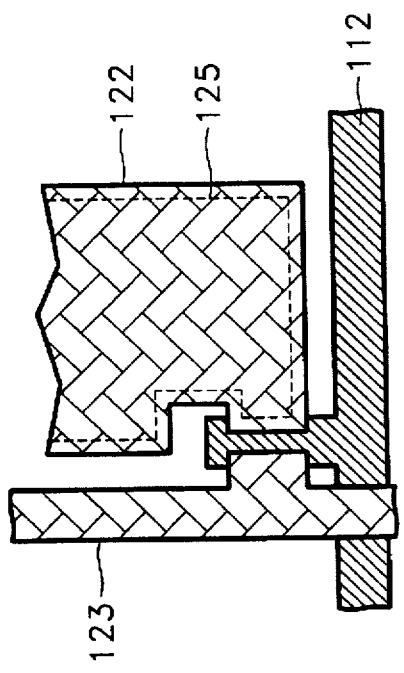
Figure 18B:
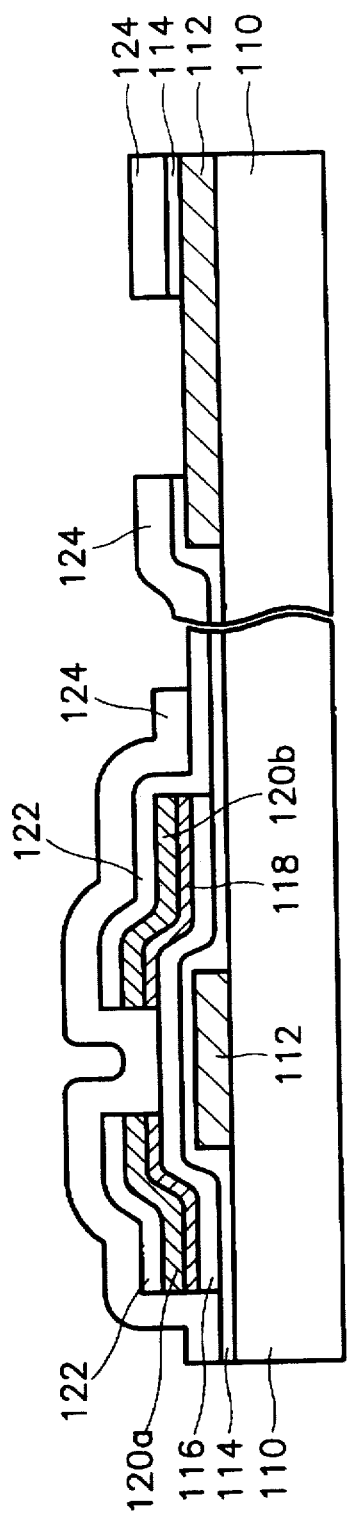

Referring to FIGS. 18A and 18B, a protective layer 124 is formed by depositing an insulating layer such as a nitride layer on the entire surface of the substrate 110, and then performing a fourth photolithography step on the protective layer 124. At this time, a portion of the protective layer 124 on the pixel electrode 112 is etched and the protective layer 124 and insulating layer 114 on the gate pad 112 are partially etched so that a portion of the pad electrode is exposed. In FIG. 18B, reference numeral 125 denotes a region where the protective layer is etched.

According to the seventh embodiment of the present invention, the manufacturing cost can be greatly reduced because the method can be implemented with four photolithography steps. In addition, the manufacturing yield can be improved. In the seventh embodiment, the gate pattern is formed using a single metal layer. The gate pattern, however, may be formed using a double-layer metal including an aluminum (or an aluminum alloy) layer on a refractory metal layer, or a refractory metal layer on an aluminum (or an aluminum alloy) layer.

FIG. 19 is a cross sectional view illustrating an eighth embodiment of the present invention, wherein a gate pattern 112 is formed of a refractory metal layer and an aluminum layer. In this case, exposure of the aluminum to air is reduced by etching upper aluminum from the metals forming the gate pad, thereby reducing the formation of an oxide film.

FIG. 20 is a cross sectional view illustrating a ninth embodiment of the present invention, wherein a gate pattern 112 is formed of an aluminum layer and a refractory metal layer. A low resistance gate interconnection can be attained using aluminum or an aluminum alloy by forming the gate pattern with a double-layer structure. Also, connection reliability of a gate pad can be improved using a refractory metal during an IC connection.

Figure 21:
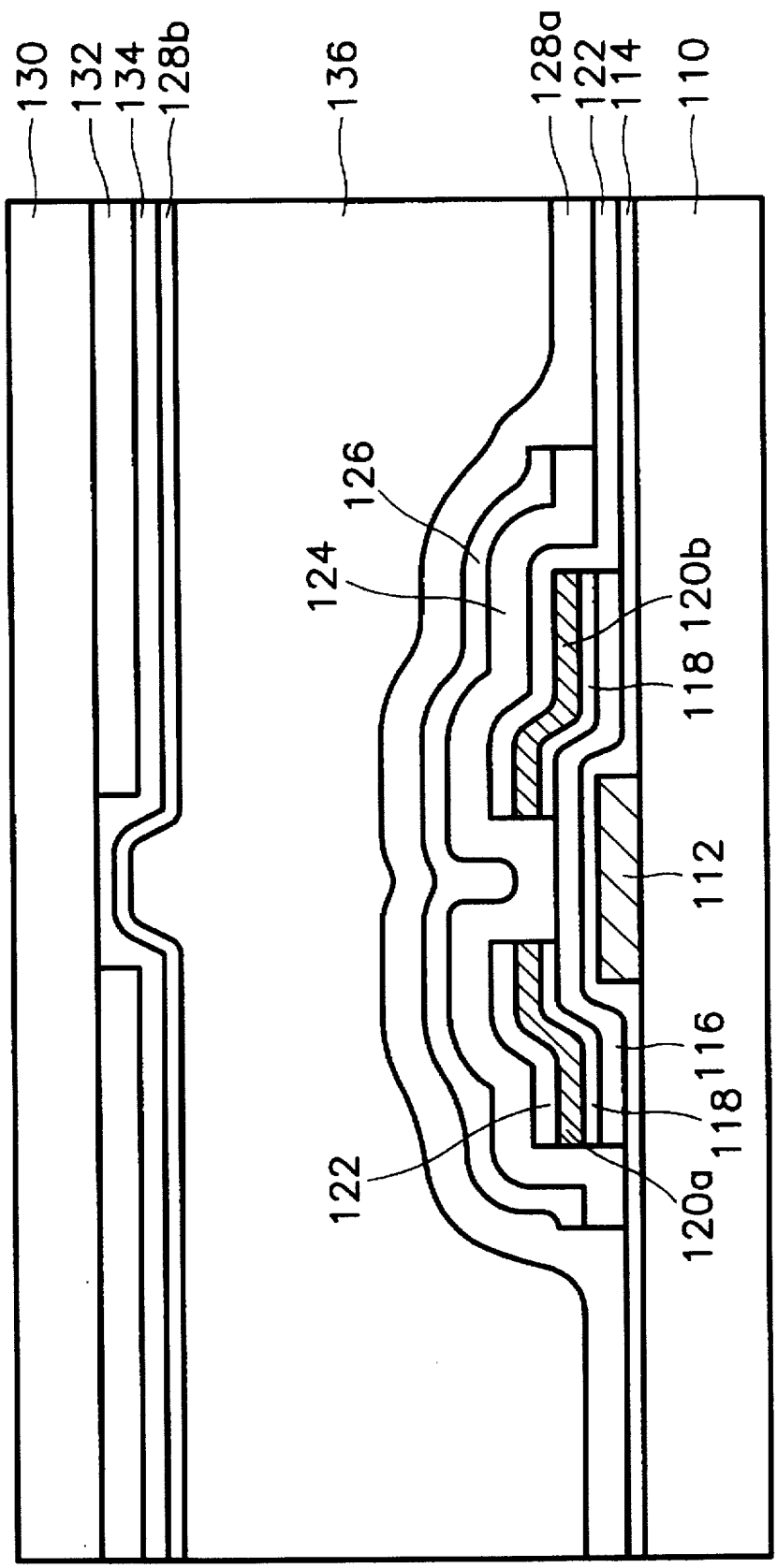
FIG. 21 is a cross sectional view illustrating a method for forming an LCD according to a tenth embodiment of the present invention.

FIG. 21 is a cross sectional view illustrating an LCD formed by a method according to a tenth embodiment of the present invention. Referring to FIG. 21, after forming a protective layer with a nitride layer on the entire surface of the substrate, the method includes the steps of the seventh embodiment up to a step of patterning a pixel electrode including the patterning of the protective layer. At this timer instead of a conventional photoresist, a black photoresist 126 containing black particles is used for patterning the protective layer. After pattering the protective layer, the black photoresist 126 is maintained without being removed, and polyimide is coated thereon to form an orientation layer 128a.

No separate black matrix is needed in the upper substrate to shield the light because the black photoresist 126 functions to shield the light by itself. Accordingly, the manufacturing procedure can be simplified and the manufacturing cost can be reduced. Reference numeral 128b denotes an orientation layer, reference numeral 130 denotes an upper substrate, reference numeral 132 denotes a color filter, reference numeral 134 denotes a common electrode, and reference numeral 136 denotes liquid crystal.

As described above, the number of photolithography steps needed to manufacture an LCD can be reduced to five photolithography steps by forming a gate electrode in a double-layer structure using aluminum or an aluminum alloy and a refractory metal by using methods according to the present invention. In addition, aluminum hillock growth can be suppressed by the released stress of the refractory metal layer.

Also, the contact between aluminum and ITO can be reduced by changing the pattern of a pad area, thereby efficiently reducing a battery effect generated by developing solutions when patterning the ITO layer for a pixel electrode. Further, an ITO layer of a pad area is patterned to be spaced apart from that of a color substrate by a predetermined distance, thereby reducing shorting between the two ITO layers as a result of conductive particles.

A semiconductor layer or a metal layer for transistor source/drain regions is formed in a portion of the pad area where a protective layer and an insulating layer are simultaneously patterned, thereby improving the step coverage of the ITO layer for a pixel electrode. In etching the protective layer and the insulating layer, the etching of the substrate between pads can be suppressed by opening the protective layer and the insulating layer for each gate pad pattern.

Also, the number of photolithography steps can be reduced by simultaneously patterning the metal layer and semiconductor layer for the source and drain. Furthermore, in the case of using a black photoresist as a mask when patterning the protective layer, a black photoresist layer can be used as it is. In other words, the manufacturing procedure can be simplified and the manufacturing cost can be reduced because a separate back matrix is not necessary in an upper substrate.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for forming a liquid crystal display including a thin film transistor, said method comprising the steps of:

depositing a first metal layer on a substrate;

depositing a second metal layer on said first metal layer opposite said substrate;

patterning said first and second metal layers to provide a gate electrode on a TFT area of said substrate and to provide a gate pad on a pad area of said substrate;

forming an insulating layer on said gate electrode and on said gate pad, and on said substrate;

forming a semiconductor layer on said insulating layer opposite said gate electrode wherein said semiconductor layer includes a channel region opposite said gate electrode and first and second spaced apart source/drain regions separated by said channel region;

forming first and second spaced apart metal source/drain electrodes on said respective first and second spaced apart semiconductor source/drain regions;

forming a protective layer on said exposed portion of said first semiconductor layer opposite said substrate, on said first and second metal source/drain electrodes opposite said substrate, and on said insulating layer opposite said gate pad;

forming a first contact hole in said protective layer exposing a portion of one of said source/drain electrodes;

forming a second contact hole in said protective layer and said insulating layer exposing a portion of said gate pad wherein said second contact hole exposes only a surface portion of said gate pad opposite said substrate;

forming a transparent conductive layer on said protective layer opposite said substrate; and patterning said transparent conductive layer to form a pixel electrode electrically connected to said exposed portion of said source/drain electrode and to said exposed portion of said gate pad.

2. A method according to claim 1 wherein said first metal layer comprises a material chosen from the group consisting of aluminum and an aluminum alloy.

3. A method according to claim 1 wherein said second metal layer comprises a refractory metal.

4. A method according to claim 1 wherein said pixel electrode covers said exposed surface portion of said gate pad and extends onto said protective layer adjacent said second contact hole.

5. A method according to claim 1 wherein said step of forming said semiconductor layer comprises forming a semiconductor layer portion on said insulating layer opposite said pad area of said substrate so that said semiconductor layer portion is adjacent said second contact hole.

6. A method according to claim 1 wherein said step of forming said metal source/drain electrodes comprises forming a metal layer portion on said insulating layer opposite said pad area of said substrate so that said metal layer portion is adjacent said second contact hole.

7. A method for forming a liquid crystal display including a thin film transistor, said method comprising the steps of:

depositing a first metal layer on a substrate;

depositing a second metal layer on said first metal layer opposite said substrate;

patterning said first and second metal layers to provide a gate electrode on a TFT area of said substrate and to provide a gate pad on a pad area of said substrate;

forming an insulating layer on said gate electrode and on said gate pad, and on said substrate;

forming a semiconductor layer on said insulating layer opposite said gate electrode wherein said semiconductor layer includes a channel region opposite said gate electrode and first and second spaced apart source/drain regions separated by said channel region;

forming first and second spaced apart metal source/drain electrodes on said respective first and second spaced apart semiconductor source/drain regions;

forming a protective layer on said exposed portion of said first semiconductor layer opposite said substrate, on said first and second metal source/drain electrodes opposite said substrate, and on said insulating layer opposite said gate pad;

forming a first contact hole in said protective layer exposing a portion of one of said source/drain electrodes;

forming a second contact hole in said protective layer and said insulating layer exposing a portion of said gate pad wherein said second contact hole exposes portions of surface portions of said gate pad opposite said substrate and portions of said substrate adjacent said gate pad;

forming a transparent conductive layer on said protective layer opposite said substrate; and patterning said transparent conductive layer to form a pixel electrode electrically connected to said exposed portion of said source/drain electrode and said gate pad.

8. A method according to claim 7 wherein said first metal layer comprises a refractory metal.

9. A method according to claim 7 wherein said second metal layer comprises a material chosen from the group consisting of Aluminum and an Aluminum alloy.

10. A method according to claim 7 wherein said pixel electrode covers said exposed surface portion of said gate pad and said substrate adjacent said gate pad, and wherein said pixel electrode extends onto said protective layer adjacent said second contact hole.

11. A method according to claim 7 wherein said step of forming said semiconductor layer comprises forming a semiconductor layer portion on said insulating layer opposite said pad area of said substrate so that said semiconductor layer portion is adjacent said second contact hole.

12. A method according to claim 7 wherein said step of forming said metal source/drain electrodes comprises forming a metal layer portion on said insulating layer opposite said pad area of said substrate so that said metal layer portion is adjacent said second contact hole.

13. A method according to claim 7 wherein said step of patterning said first and second metal layers comprises providing a plurality of interconnections on said pad area of said substrate wherein said interconnections are connected to said gate pad.

14. A method for forming a liquid crystal display, said method comprising the steps of:

forming a first metal layer on a substrate;

patterning said first metal layer to provide a gate electrode on a TFT area of said substrate and to provide a gate pad on a pad area of said substrate;

forming an insulating layer on said gate electrode and on said gate pad;

forming a patterned semiconductor layer on said insulating layer opposite said gate electrode and opposite said gate pad;

forming a second patterned metal layer on said semiconductor layer opposite said insulating layer;

forming a transparent conductive layer on said second patterned metal layer and on said insulating layer opposite said substrate; and patterning said transparent conductive layer, said second patterned metal layer, and said patterned semiconductor layer to provide a data line, metal source/drain electrodes, and a pixel electrode.

15. A method according to claim 14 further comprising the steps of:

forming a protective layer on said substrate covering said data line, said source/drain electrodes, and said pixel electrode; and patterning said protective layer to expose portions of said pixel electrode.

16. A method according to claim 15 wherein said step of patterning said protective layer comprises forming a black photoresist mask, and wherein said black photoresist mask is maintained on said protective layer thereby providing a black matrix.

17. A method according to claim 14 wherein said semiconductor layer includes a first amorphous silicon layer and a second doped amorphous silicon layer on said first amorphous silicon layer opposite said substrate.

18. A method according to claim 17 wherein said step of patterning said semiconductor layer comprises etching a portion of said second doped amorphous silicon layer between said source/drain electrodes.

19. A method according to claim 14 wherein said first metal layer comprises a material selected from the group consisting of Aluminum, an Aluminum alloy, and a refractory metal.

20. A method according to claim 14 wherein said first metal layer includes a first sub-layer comprising a refractory metal, and a second sub-layer comprising a material chosen from the group consisting of Aluminum and an Aluminum alloy.

21. A method according to claim 14 wherein said first metal layer includes a first sub-layer comprising a refractory metal on said substrate and a second sub-layer comprising a material chosen from the group consisting of Aluminum and an Aluminum alloy on said first sub-layer opposite said substrate.

22. A method according to claim 21 wherein said refractory metal selected from the group consisting of chromium (Cr), Molybdenum (Mo), Titanium (Ti), and Tantalum (Ta).

23. A method according to claim 14 wherein said first metal layer includes a first sub-layer comprising a material chosen from the group consisting of Aluminum and an Aluminum alloy on said substrate and a second sub-layer comprising a refractory metal on said first sub-layer opposite said substrate.

24. A method according to claim 23 wherein said refractory metal selected from the group consisting of chromium (Cr), Molybdenum (Mo), Titanium (Ti), and Tantalum (Ta).

25. A method according to claim 14 further comprising the step of removing a portion of said second sub-layer from said gate pad.

* * * * *